Oct. 6, 1959   J. B. EISEN ET AL   2,907,626
METAL COATING OF GLASS FIBERS AT HIGH SPEEDS
Filed Jan. 15, 1958

INVENTORS
JOHAN BJORKSTEN
JOHN B. EISEN
JOHN S. NACHTMAN
LAWRENCE A. ROE

BY
John L. Diehl
Attorney

United States Patent Office 2,907,626
Patented Oct. 6, 1959

2,907,626

METAL COATING OF GLASS FIBERS AT HIGH SPEEDS

John B. Eisen, Waterloo, Wis., John Simon Nachtman, Washington, D.C., Johan Bjorksten, Madison, Wis., and Lawrence A. Roe, Lake Bluff, Ill.; said Eisen assignor to Bjorksten Research Laboratories, Inc., Fitchburg, Wis., a corporation of Illinois Application January 15, 1958, Serial No. 709,017

6 Claims. (Cl. 18—54)

This invention relates to a process for making metal coated ceramic fibers, and more particularly metal coated glass fibers, which involves application of metal from a carbonyl compound in vapor phase at very high speeds.

The invention is an improvement on the invention disclosed in co-pending application Serial Number 382,518, filed September 28, 1953, now abandoned, entitled Method For Metal Coating Glass Surfaces at Higher Speeds, inventors John B. Eisen, Johan Bjorksten, Lawrence A. Roe and John S. Nachtman, of which this application is a continuation-in-part.

Heretofore it has been possible to effect coating of a glass fiber with metal by heating the fiber to an elevated temperature and passing it through a metal carbonyl atmosphere, at a slow speed such as 2 to 10 or perhaps even 200 feet per minute.

An object of the present invention is to perform the same operation with equal or better results at speeds of from 1000 to 10,000 feet per minute, perferably exceeding 10,000 feet per minute.

Other objects will become apparent from the drawings and from the following detailed description in which it is intended to illustrate the applicability of the invention without thereby limiting its scope to less than that of all equivalents which will be apparent to one skilled in the art. Like reference numerals refer to like parts and in which.

As disclosed herein, the process of coating metal from a carbonyl in vapor phase comprises three main steps, namely:

(1) The decomposition of metal carbonyl to form a free radical compound of extremely short durability. At the high temperature involved, these free radicals react in less than 1/100 second, to either decompose or condense to non-reactive polymeric compounds;

(2) The attachment of the free radical compound to the glass, by a bond involving the metal atom;

(3) The further decomposition of the free radical compound which eliminates the carbon containing groups, and leaves a clean metal coating.

While the two latter steps take place in an exceedingly short time (on the order of less than one-thousandth of a second), the formation of the free radicals requires much more time at the temperatures heretofore employed, and at approximately 200 to 300 degrees centrigrade requires a time on the order of magnitude of 1/5 to 1/10 of a second. This formation of free radicals theretofore is a limiting factor in the speed of metal coating of ceramic fibers according to prior art.

The aforementioned application relates to the discovery that if the newly made fiber is passed through a zone where the metal carbonyl is heated to a temperature in excess of the ignition temperature of the particular carbonyl being used, such as, for example, may be obtained with a carbonyl flame, the generation of free radicals is accelerated to the same rate of speed as the two subsequent steps. As a result, it is then possible to effect coating of the fiber at a rate 50 to 100 times faster than has been possible heretofore.

It is preferred to cause the fiber to pass through a flame of the carbonyl with oxygen and apparatus is described therein for providing a quantity of a metal carbonyl gas, which may be diluted with an inert gas, surrounding and contacting the rapidly moving fiber just below a bushing and providing for continuous burning of the gas. Said apparatus includes a tubular gas-containing chamber through which the fiber is passed. Said apparatus is cumbersome and ineffective and causes many operational difficulties due to contact of the fiber with portions of the apparatus. The apparatus soon fills with metal being deposited from the carbonyl and must be stopped to be cleaned out.

Figure 1:
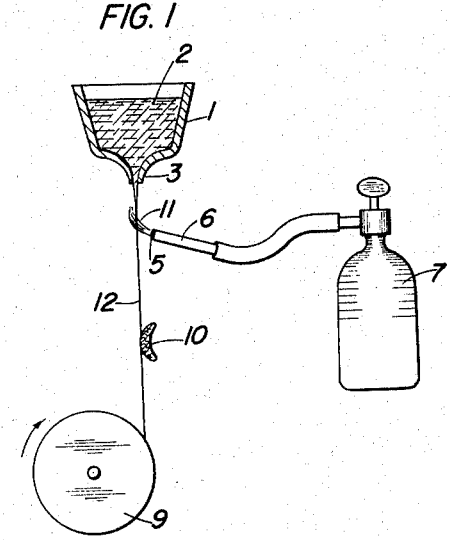
Figure 1 is a schematic cross-sectional view of an embodiment of the process.

Referring to Figure 1, wherein there is shown a specific example, a crucible or "bushing" 1 contains molten glass 2 and is heated by means not shown. Molten glass 2 is drawn through an orifice 3 into a thin fiber 12. The fiber is then wound on revolving drum 9. Before coming into contact with drum 9 it may be either lubricated and sized, or both lubricated and sized, by a lubricant applicator 10. Between bushing 1 and applicator 10 a tubular member 6 having an opening 5 near the fiber is provided. Gaseous metal carbonyl 8 is contained in container 7 and is fed through tube 6 either in concentrated form or diluted with an inert gas, such as for example, nitrogen or argon.

Carbonyl passing out from opening 5 is ignited by any suitable means to provide flame 11 of metal carbonyl burning with the oxygen of the air. Tubing 6 is then suitably directed as shown to cause the fiber to pass through flame 11. The fiber is thereupon coated with a relatively smooth and uniform metallic layer, even when traveling at speeds exceeding two miles per minute. If the flame is extinguished, even though the carbonyl flow is kept constant and the temperature at the bushing is kept constant, the coating of the fiber immediately stops completely so that no coating at all can be observed. The flame temperature at which the coating takes place is believed to be in the order of 1500° to 2000° C.

Figure 2:
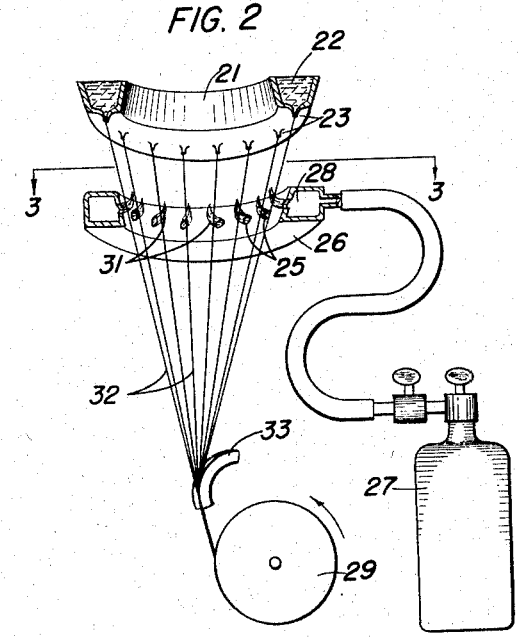
Figure 2 is a schematic cross-sectional perspective view of another embodiment.

Referring now to Figure 2, there is shown bushing 21 having a plurality of holes or orifices 23 therein and containing a molten ceramic 22 such as glass, which is vented by means not shown. A plurality of fibers 32 are drawn therefrom through orifices 23 and caused to pass downward into contact with a gathering pad 33 and thence are wound up around a rapidly rotating wheel 29 which exerts pulling action thereon. If desired a lubricating and sizing compound such as a mixture of starch and oil or a solution of vinyl chloride or methyl methacrylate in a suitable solvent may be applied to the fibers by providing a quantity of same on pad 33. Near the fibers a tubular header or distributing tube 26 is provided which contains metal carbonyl 28 supplied from container 27. Openings 25 are provided in tube 26 suitably located so that flames 31 issuing therefrom may be directed against the fibers. In operation, carbonyl 28 is caused to flow outwardly through openings 25 and is ignited by means not shown, thus providing flames 31 of carbonyl burning with oxygen which are directed against fibers 32.

Figure 3:
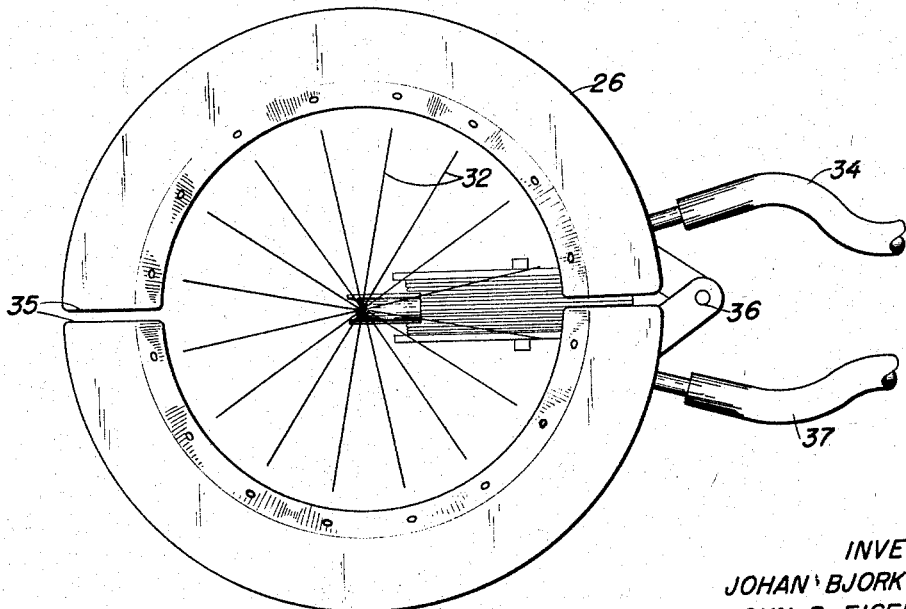
Figure 3 is a cross-section view of an entire unit taken on lines 3—3 in Figure 2.

As shown in Figure 3, header 26 may be generally annular in form but may be discontinuous, having closed ends at 35, and may consist of two portions, hingedly attached at 36. The header may easily be removed from near the fibers 32 to permit cleaning or inspection by opening the parts hingedly at hinge 36. The two portions of the header may be separately supplied with gaseous carbonyl through tubes 34 and 37.

According to the method of our invention, difficulties inherent in previous methods are obviated or entirely eliminated. The fibers may be caused to be drawn or the drawing may be stopped without interrupting the flow or behavior of the metal applying device and, in operation, the flame providing device may be removed and coating stopped or may be brought near the fiber to start the coating of the fiber without interrupting the forming of the fiber.

While the illustration and example show a specific embodiment of the invention, it is understood that we may use any metal carbonyl, such as for example, cobalt, nickel, molybdenum, tungsten or iron carbonyl. While we have used a burning carbonyl as a source of free radicals, we could also employ a high temperature zone, in which the carbonyl is instantaneously heated to a correspondingly high temperature.

One may employ 100% carbonyl, or may employ the carbonyl suspended in an inert gas, such as nitrogen, helium, neon, argon, or the like. Usually it is preferred to use at least 10% carbonyl in the gas. However, for some purposes where very thin metal films are desired, one may use much greater dilution, even as little as 1% of the metal carbonyl.

It is thus seen that the invention is broad in scope and is not to be restricted excepting by the claims, in which it is our intention to cover all novelty inherent in this invention as broadly as possible, in view of prior art.

Having thus disclosed our invention, we claim:

1. The process for providing ceramic fiber coated with metal which comprises the steps of drawing a fiber from a mass of molten ceramic and passing the fiber, while still hot, with heat from said mass, through a flame of burning gaseous metal carbonyl.

2. The process of claim 1 wherein said metal carbonyl is iron carbonyl.

3. The process of claim 1 wherein said metal carbonyl is nickel carbonyl.

4. The process for providing ceramic fiber coated with metal which comprises the steps of providing a mass of molten ceramic, drawing a fiber therefrom, providing a gaseous body of a gaseous mixture consisting essentially of inert gas and gaseous metal carbonyl, adjacent to a body of air, said bodies being in close proximity to said fiber, igniting said gaseous mixture to cause combustion thereof with the oxygen of said air to provide a flame and passing said fiber while still hot with the heat of said molten mass through said flame.

5. The process for providing ceramic fibers coated with metal which comprises the steps of continuously drawing a fiber from a mass of molten ceramic, continuously forcing gaseous metal carbonyl into contact with said fiber in an area near said mass of molten ceramic wherein said fiber is still hot, and causing said carbonyl to undergo combustion in said area wherein said carbonyl is in contact with said fiber so that said fiber passes through a flame front resulting from said combustion.

6. The process for providing ceramic fibers coated with metal which comprises the steps of providing a continuous stream of gas comprising gaseous metal carbonyl having a rate of flow adapted to provide a stable flame front when burnt in air, igniting said stream and thereby providing a stable flame front of burning carbonyl gas and drawing a ceramic fiber from a mass of molten glass in such manner that reduction of diameter of the said fiber occurs close to said flame front and the portion of the continuously moving fiber entering said flame front retains heat previously contained therein while a part of said molten mass.

References Cited in the file of this patent

UNITED STATES PATENTS

| | | |
|---|---|---|
| 2,147,450 | Liebmann | Feb. 14, 1939 |
| 2,292,026 | Gillett | Aug. 4, 1942 |
| 2,315,328 | Hood et al. | Mar. 30, 1943 |
| 2,344,138 | Drummond | Mar. 14, 1944 |
| 2,375,482 | Lyle | May 8, 1945 |
| 2,432,657 | Colbert et al. | Dec. 16, 1947 |
| 2,526,731 | Coburn | Oct. 24, 1950 |
| 2,577,936 | Waggoner | Dec. 11, 1951 |
| 2,616,165 | Brennan | Nov. 4, 1952 |
| 2,685,535 | Nack | Aug. 3, 1954 |
| 2,699,415 | Nachtman | Jan. 11, 1955 |

FOREIGN PATENTS

| | | |
|---|---|---|
| 849,842 | France | Aug. 28, 1939 |